United States Patent [19]

Pattee

[11] Patent Number: 4,950,022

[45] Date of Patent: Aug. 21, 1990

[54] CONVERTIBLE HARD-TOP PASSENGER VEHICLE

[76] Inventor: Clark C. Pattee, 1460½ W. Third St., Davenport, Iowa 52808

[21] Appl. No.: 400,902

[22] Filed: Aug. 30, 1989

[51] Int. Cl.$^5$ .............................. B60J 7/16; B60J 7/14
[52] U.S. Cl. .................................... 296/107; 296/108; 296/124; 296/216
[58] Field of Search ............... 296/107, 108, 124, 216, 296/116

[56] References Cited

U.S. PATENT DOCUMENTS

| | | | |
|---|---|---|---|
| 1,819,545 | 8/1931 | Delp | 296/107 |
| 2,462,667 | 2/1949 | O'Neal | 296/107 |
| 2,939,742 | 6/1960 | Dardarian et al. | 296/107 |
| 3,823,977 | 7/1974 | Fioravanti | 296/107 X |
| 4,805,956 | 2/1989 | Saunders | 296/107 |
| 4,819,982 | 4/1989 | Eyb | 296/107 |

FOREIGN PATENT DOCUMENTS 0650980  8/1985  Switzerland ..................... 296/107
783345   9/1957  United Kingdom .............. 296/107

OTHER PUBLICATIONS

Automotive Industries, Feb. 1990, page. 52, "Let the Sun Shine In!".

*Primary Examiner*—Dennis H. Pedder
*Attorney, Agent, or Firm*—Henderson & Sturm

[57] ABSTRACT

A passenger vehicle is equipped with a hard top that is selectively movable between up and storage modes, being mounted on a pair of transversely alined posts that project upwardly from opposite sides of the vehicle to upper end portions that provide pivots alined on a transverse axis appreciably above the belt line of the vehicle and just forwardly of a fore portion of a closed rear deck. The top is an L-shaped structure having a roof and right and left legs rigid with the roof and mounted on the pivots so that the roof is capable of 180° inversion from an up mode in which the roof overlies the passenger compartment to a storage mode in which the roof overlies the rear deck.

2 Claims, 2 Drawing Sheets

CONVERTIBLE HARD-TOP PASSENGER VEHICLE

BACKGROUND AND SUMMARY OF THE INVENTION

The prior art is replete with examples of many types of convertible tops other than the typical soft-top convertible, consisting largely of hard-tops that are storable in the vehicle trunk. Tops of this type rely upon complicated linkages, tracks and the like for transition between up and storage modes. Typical of these is the U.S. Pat. No. to Dardanian 2,939,742 and Spear U.S. Pat. No. 2,768,024. There are also examples wherein the hard top is movable to a storage position atop the rear deck without being contained in the vehicle trunk, as in the U.S. Pat. No. to Grimston 2,051,140.

The basic idea of the foregoing examples and others of that character is to accomplish convertability without complete removal and home storage of the hard top. Nevertheless, although this object has been achieved to some extent, it is at the expense of costly and complicated mechanism and in most cases renders the vehicle trunk unavailable for other purposes; e.g., luggage and like equipment.

The foregoing and other significant disadvantages are eliminated by the present invention by means of a simplified design and construction in which the hard top is conveniently carried for substantially 180° inversion from an up or passenger-protection position to a down or storage position without the use of linkages, tracks and the like and without significantly interfering with substantially normal use of the vehicle trunk. Fundamentally, the invention provides a simple and low cost design that may be incorporated in a typical passenger vehicle design initially or via relatively inexpensive customizing.

The foregoing and other important objects and features of the invention will be seen from the ensuing disclosure of preferred embodiments of the invention.

DETAILED DESCRIPTION OF PREFERRED EMBODIMENTS OF THE INVENTION

FIGS. 1-4

Figure 1:
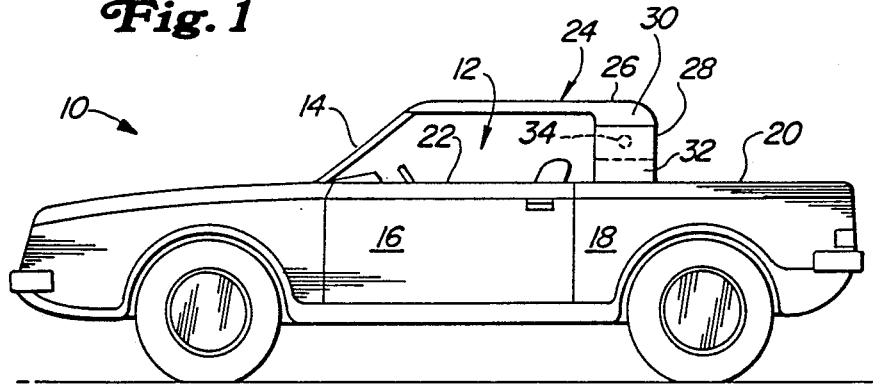
FIG. 1 is a side elevation of the invention as applied to a two-door vehicle, illustrating the top in its up mode.

The passenger vehicle shown here by way of example is a two-door model having a fore-and-aft body 10 typically provided with a passenger compartment 12 delineated at its front by a windshield 14, at opposite sides by right and left doors 16 which are part of right and left side walls 18, and at its rear by the fore portion of a trunk closed by flat-topped rear deck lid 20, the tops of the side walls and doors being typically at the belt line 22 of the body and the deck lid being essentially in the plane of that belt line.

The top of the vehicle is an L-shaped structure 24 made up of a rigid roof 26 and a fixedly attached rear wall part 28, here mainly a rear glass that may be easily removed or dropped down behind the seat or in other fashion not material to the present invention. That much of the rear wall that serves as rigid depending frame parts of the top comprises right and left legs 30 that lie closely alongside and right and left post members 32 that are rigidly affixed to and rise respectively from the body side walls 18. These legs are pivoted to the upper portions of the post by pivots 34 that are aligned on a transverse horizontal axis spaced appreciably above the belt line of the body and just forwardly of a fore portion of the deck lid 20. The pivots may be of any type and the details thereof are not material here.

Figures 3, 4:
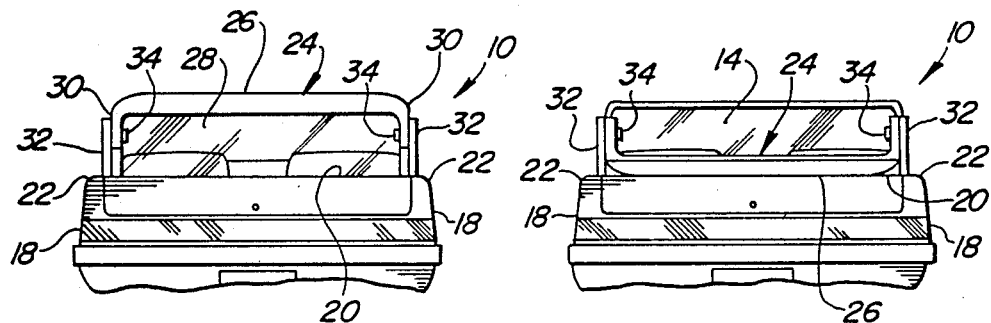
FIG. 3 is a fragmentary rear elevation of the structure of FIG. 1.
FIG. 4 is a fragmentary rear elevation of the structure of FIG. 2.

When the top is in its up mode (FIGS. 1 and 3) the roof overlies the passenger compartment and may be latched to the windshield in any acceptable manner, as in the case of the typical soft-top convertible, another aspect that forms no part of the present invention in detail. The legs 30 lie closely inwardly of the posts and the rear window may be replaced, rolled up, etc., as the case may be. Suitable sealing elements (not shown) may be used to close any gaps between the legs and posts, etc., again not detailed parts of the invention.

Figure 2:
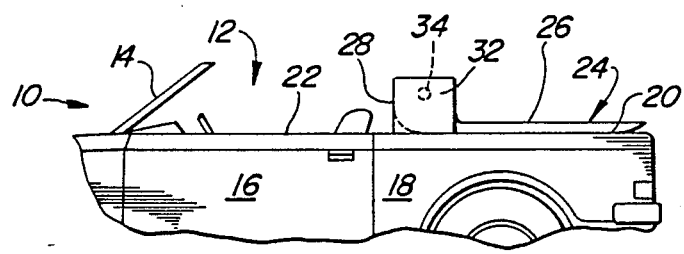
FIG. 2 is a fragmentary elevation of the vehicle with the top in its storage mode.

To effect movement of the top to its down or storage position (FIGS. 2 and 4), it is merely necessary, after release of latch means, removal of seals, etc., and displacement of the rear window, to swing the top, manually or otherwise, through 180° to its inverted position in which the roof overlies the deck lid, in which mode suitable means may be provided to hold the inverted top in place. All this can be achieved without removing the top and without using the interior of the trunk. Because of the light-weight nature of the roof, it may be easily tilted upwardly to enable access to the trunk, it being assumed that the trunk or deck lid is conventionally hinged at its front end.

Figure 5:
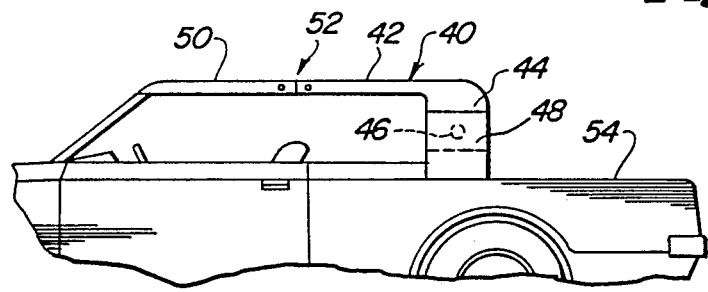
FIG. 5 is a fragmentary elevation of a modified form of the invention as including a two-piece top, the view showing the top in its up mode.
Figure 6:
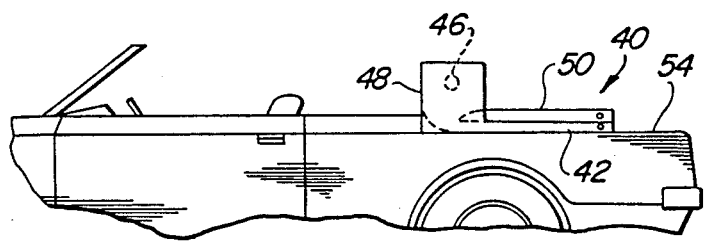
FIG. 6 is like FIG. 5 but shows the top in its stored mode.

FIGS. 5 and 6

The essential components already described are employed in this version wherein a longer passenger vehicle has been chosen for illustration. The elements common to both versions of the invention will be recognized with repeating the numbered description. Suffice it to note that the top 40 is made up of a rigid L-shaped rear structure including a roof part 42 and legs 44 which are pivoted on a transverse axis by pivots 46 to posts 48 that rise rigidly from the side walls of the body as before. In addition, the roof is elongated by a fore part 50 pivoted at 52 on transverse axes so to the rear part 42 as to be foldable relative to the rear part when the top is in its down or stored mode overlying the vehicle rear deck lid 54. When the roof is in its up position to overlie the passenger compartment, the roof parts complement each other so as to extend forwardly to the windshield. Suitable means may be provided to lock the pivots 52 in the up mode of the top, details that form no part of the invention.

CONCLUSION

In the basic form of the invention, the key is simplicity, using few moving parts and enabling convenient inversion of the top from one position to the other, all without requiring removal of the top and without using the rear trunk for storage of the down top. Features other than those pointed out will readily occur to those versed in the art, along with modifications, etc., in the preferred embodiments disclosed, all without departure from the spirit and scope of the invention.

I claim:

1. A hard-top convertible passenger vehicle having a fore-and-aft body having a fore-and-aft belt line and including a passenger compartment delineated at its front by a windshield, at opposite sides by longitudinal right and left side walls and at its rear by a rearwardly extending deck having a closed lid at about the belt line of the body and a bipositionable hard top, characterized in that transversely alined right and left rigid post elements are fixedly carried respectively by the right and left side walls closely adjacent to a forward portion of the deck and rise therefrom to upper end portions disposed at a level appreciably above that of the side walls, belt line and deck lid and the hard top is an L-shaped structure including a roof and right and left leg members fixed to the roof and extending respectively closely alongside the post elements and pivoted to the upper end portions of said elements on a transverse axis for swinging of the top between an up mode in which the roof extends forwardly from the post elements and overlies the passenger compartment to an inverted storage mode in which the roof uncovers the compartment and extends rearwardly of the post elements and overlies the deck lid.

2. The invention defined in claim 1, in which the top includes a transverse rear wall affixed to the roof and extending between the posts and the right and left legs are respectively right and left end elements on the rear wall.

* * * * *